(12) United States Patent
Fukushima et al.

(10) Patent No.: US 11,342,690 B2
(45) Date of Patent: May 24, 2022

(54) FIXING STRUCTURE OF SPLICE PART

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Daichi Fukushima, Mie (JP); Housei Mizuno, Mie (JP); Miyu Aramaki, Mie (JP); Tetsuya Nishimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES LTD., Osaka (JP)

( * ) Notice: Subject to any disclaimer, the term of this patent is extended or adjusted under 35 U.S.C. 154(b) by 0 days.

(21) Appl. No.: 17/263,302

(22) PCT Filed: Jul. 12, 2019

(86) PCT No.: PCT/JP2019/027655
§ 371 (c)(1),
(2) Date: Jan. 26, 2021

(87) PCT Pub. No.: WO2020/026762
PCT Pub. Date: Feb. 6, 2020

(65) Prior Publication Data
US 2021/0167523 A1    Jun. 3, 2021

(30) Foreign Application Priority Data
Aug. 1, 2018   (JP) .............................. JP2018-145003

(51) Int. Cl.
*H01R 4/18*   (2006.01)
*H01R 4/70*   (2006.01)

(52) U.S. Cl.
CPC ............... *H01R 4/183* (2013.01); *H01R 4/70* (2013.01)

(58) Field of Classification Search
None
See application file for complete search history.

(56) References Cited

U.S. PATENT DOCUMENTS

| | | | | |
|---|---|---|---|---|
| 1,586,811 A | * | 6/1926 | Kemp | H02G 1/14 |
| | | | | 264/274 |
| 5,901,441 A | * | 5/1999 | Kawamura | H01R 4/70 |
| | | | | 29/873 |

(Continued)

FOREIGN PATENT DOCUMENTS

| | | | | | |
|---|---|---|---|---|---|
| CN | 1072802 A | * | 6/1993 | ......... | B29C 65/1425 |
| CN | 1969427 A | * | 5/2007 | ............... | H02G 1/14 |

(Continued)

OTHER PUBLICATIONS

International Search Report issued in International Patent Application No. PCT/JP2019/027655, dated Oct. 8, 2019.

(Continued)

*Primary Examiner* — Timothy J. Dole
*Assistant Examiner* — Muhammed Azam
(74) *Attorney, Agent, or Firm* — Greenblum & Bernstein, P.L.C.

(57) ABSTRACT

A fixing structure of a splice part includes a plurality of electrical wires each having a splice part and mutually connected and a sheet material to which the splice part is fixed. The fixing structure of the splice part is considered to have a portion of the plurality of electrical wires fixed to the sheet material in addition to the splice part.

11 Claims, 10 Drawing Sheets

(56) References Cited

U.S. PATENT DOCUMENTS

| | | | |
|---|---|---|---|
| 7,112,745 B2 | 9/2006 | Hatori | |
| 2006/0048965 A1* | 3/2006 | Ootsuki | H01R 13/52 174/74 A |
| 2013/0075152 A1* | 3/2013 | Mazzone | H02G 3/04 174/481 |
| 2015/0096786 A1* | 4/2015 | Takasu | B32B 7/00 174/145 |
| 2018/0309257 A1* | 10/2018 | Satou | H01R 43/02 |
| 2020/0172027 A1* | 6/2020 | Mizuno | H01B 7/00 |
| 2021/0057128 A1* | 2/2021 | Takata | H01B 7/0045 |

FOREIGN PATENT DOCUMENTS

| | | | | |
|---|---|---|---|---|
| CN | 104205514 | | 12/2014 | |
| CN | 107768843 | | 3/2018 | |
| EP | 0732787 | A1 * | 9/1996 | H02G 1/14 |
| EP | 3598580 | A1 * | 1/2020 | H01R 4/027 |
| ES | 2519616 | T3 * | 11/2014 | H02G 15/007 |
| JP | 8-8024 | | 1/1996 | |
| JP | 2000-294060 | | 10/2000 | |
| JP | 2003-18718 | | 1/2003 | |
| JP | 2005-166506 | | 6/2005 | |
| JP | 2005-302389 | | 10/2005 | |
| JP | 41-17327 | | 7/2008 | |
| JP | 2009001167 | A * | 1/2009 | H01R 4/70 |
| JP | 2013-187068 | | 9/2013 | |
| JP | 2019003925 | A * | 1/2019 | H02G 3/30 |
| JP | 2020022283 | A * | 2/2020 | H01R 4/183 |
| WO | WO-2016084581 | A * | 6/2016 | H02G 1/14 |
| WO | WO-2016088618 | A1 * | 6/2016 | H01R 4/20 |
| WO | WO-2017169795 | A1 * | 10/2017 | H01B 7/40 |
| WO | WO-2018030151 | A1 * | 2/2018 | H02G 3/04 |
| WO | WO-2018030233 | A1 * | 2/2018 | H01B 7/00 |
| WO | WO-2019215995 | A1 * | 11/2019 | H01B 7/0045 |
| WO | WO-2019230080 | A1 * | 12/2019 | G02B 6/3628 |
| WO | WO-2020026762 | A1 * | 2/2020 | H02G 1/14 |
| WO | WO-2020241200 | A1 * | 12/2020 | H01B 7/08 |
| WO | WO-2020241244 | A1 * | 12/2020 | H01B 7/18 |
| WO | WO-2021020058 | A1 * | 2/2021 | C09J 201/06 |
| WO | WO-2021049615 | A1 * | 3/2021 | H02G 3/04 |
| WO | WO-2021095524 | A1 * | 5/2021 | F16B 7/04 |
| WO | WO-2021095525 | A1 * | 5/2021 | H01B 7/08 |
| WO | WO-2021100498 | A1 * | 5/2021 | B60R 16/02 |
| WO | WO-2021100511 | A1 * | 5/2021 | H02G 3/04 |
| WO | WO-2021124896 | A1 * | 6/2021 | H01B 7/00 |
| WO | WO-2021166874 | A1 * | 8/2021 | H01B 7/00 |
| WO | WO-2021171961 | A1 * | 9/2021 | B60R 16/02 |
| WO | WO-2021200158 | A1 * | 10/2021 | H01B 7/00 |

OTHER PUBLICATIONS

International Preliminary Report on Patentability issued in International Patent Application No. PCT/JP2019/027655, dated Mar. 3, 2020.

Written Opinion issued in International Patent Application No. PCT/JP2019/027655, dated Oct. 8, 2019.

Japan Official Action issued in Japan Patent Application No. 2018-145003, dated Aug. 31, 2021, together with English translation thereof.

China Office Action issued in China Patent Application No. 201980050426.9, dated Jan. 28, 2022, together with English translation thereof.

* cited by examiner

FIXING STRUCTURE OF SPLICE PART

TECHNICAL FIELD

The present disclosure relates to a fixing structure of a splice part.

BACKGROUND ART

Patent Document 1 discloses a technique of winding a splice part covered by a cap around a main wire of a wire harness with an adhesive tape for positioning.

PRIOR ART DOCUMENTS

Patent Documents

Patent Document 1: Japanese Patent Application Laid-Open No. 2005-166506

SUMMARY

Problem to be Solved by the Invention

However, in the technique described in Patent Document 1, an electrical wire bundle and an adhesive tape for winding a splice part are necessary as members, and an operation of winding the adhesive tape around the splice part and the electrical wire bundle is necessary as an operation.

Therefore, it is art object to provide a novel fixing structure of a splice part in which tire splice part needs not be wound around the electrical wire bundle by the adhesive tape.

Means to Solve the Problem

A fixing structure of a splice part according to the present disclosure is a fixing structure of a splice part including a plurality of electrical wires each having a splice part and mutually connected and a sheet material to which the splice part is fixed.

Effects the Invention

According to the present disclosure, a novel fixing structure of a splice part in which the splice part needs not be wound around the electrical wire bundle by the adhesive tape can be provided.

DESCRIPTION OF EMBODIMENT(S)

Description of Embodiment of Present Disclosure

Figure 1:
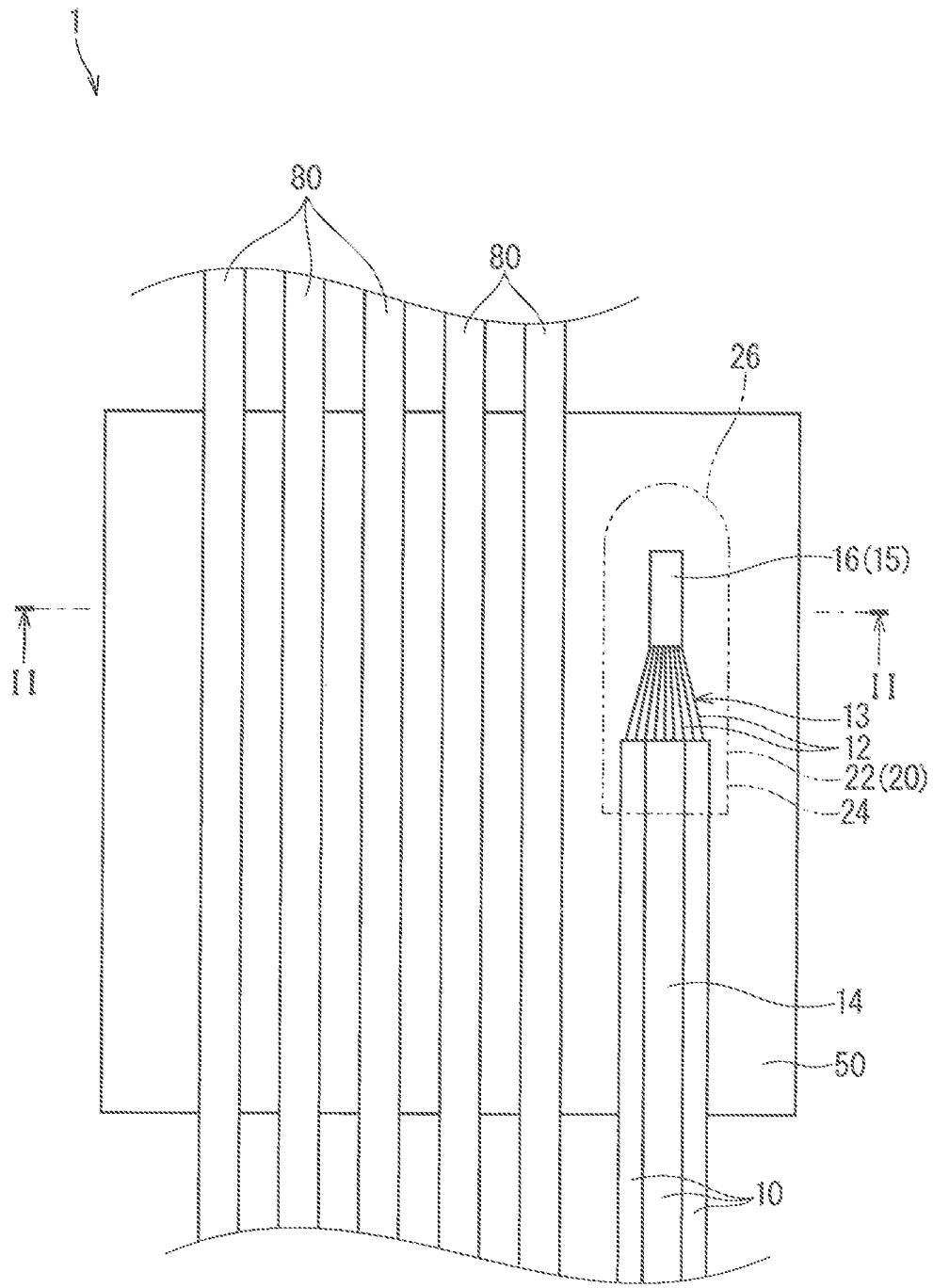
FIG. 1 is a plan view illustrating a fixing structure of a splice part according to a first embodiment.

Embodiments of the present disclosure are listed and described firstly.

A fixing structure of a splice part according to the present disclosure is as follows.

(1) A fixing structure of a splice part according to the present disclosure is a fixing structure of a splice part including a plurality of electrical wires each having a splice part and mutually connected and a sheet material to which the splice part is fixed. The splice part is fixed to the sheet material, thus the splice part can be fixed without winding the splice part around an electrical wire bundle by an adhesive tape.

(2) A portion of the plurality of electrical wires away from the splice part may be fixed to the sheet, material in addition to the splice past. Accordingly, the splice part and the other portion of the electrical wires can be positioned.

(3) The fixing structure may further include a wire-like transmission member provided separately from the plurality of electrical wires and fixed to the sheet material. Accordingly, the splice part and the other wire-like transmission member can be positioned.

(4) The fixing structure may further include a wrapping material fixed to the sheet, material in a state of wrapping a whole periphery of die splice part. The splice part wrapped with the wrapping material can be fixed to the sheet material.

(5) The wrapping material may include a tube-like member molded into a tube-like shape and housing the splice part therein. Accordingly, the splice part with the tube-like member can be fixed to the sheet material.

(6) The wrapping material may include a winding piece formed separately from the sheet material and wound around the periphery of the splice part to wrap the splice part. Accordingly, the splice part with the winding piece can be fixed to the sheet material.

(7) The wrapping material may be fixed to the sheet material by a contact area indirect fixation. The wrapping material can be simply fixed, to the sheet material.

(8) The wrapping material may be fixed to the sheet material by a contact area direct fixation. Accordingly, the wrapping material can be fixed to the sheet material without using the other member.

(9) The fixing structure may further include a sandwiching piece fixed to the sheet material in a state where the splice part is sandwiched between the sandwiching piece and the sheet material. Accordingly, the sheet material can be used as a pall of a protection part protecting the splice part. The formation of the protection part and the positioning of the spike part can be performed together.

(10) A parallel part in which the plurality of electrical wires are arranged parallel to each other may be sandwiched between the sheet material and the sandwiching piece.

Accordingly, a gap between the electrical wires can be filled easily compared with a bundle part.

(11) The sandwiching piece may be formed by folding a part of the sheet material. Accordingly, a protection material needs not be provided separately from the sheet material.

(12) The sandwiching piece may be formed separately from the sheet material. Accordingly, a material and a thickness of the sandwiching piece can be different from those of the sheet material.

(13) The sandwiching piece and the sheet material may be fixed by a contact area direct fixation. Accordingly, the sandwiching piece and the sheet material can be fixed to each other without using a fixing member such as an adhesive agent.

(14) A housing space component part constituting a housing space of the splice part in the sheet material and the sandwiching piece and a portion of the electrical wire constituting the splice part having contact with the housing space component part may be fixed by a contact area direct fixation in a liquid-tight form. Accordingly, the housing space of the splice part can be waterproofed using the contact area direct fixation.

(15) Another side member fixed to the sheet material by a contact area direct fixation may be formed by a material identical with a material of the sheet material. A fixing strength of the contact area direct fixation between the sheet material and the other side member can be increased easily.

Details of Embodiment of Present Disclosure

Specific examples of a fixing structure of a splice part according to the present disclosure are described hereinafter with reference to the drawings. The present invention is not limited to these examples, but is indicated by claims, and it is intended that meanings equivalent to claims and all modifications within a scope of claims are included.

First Embodiment

Figure 2:
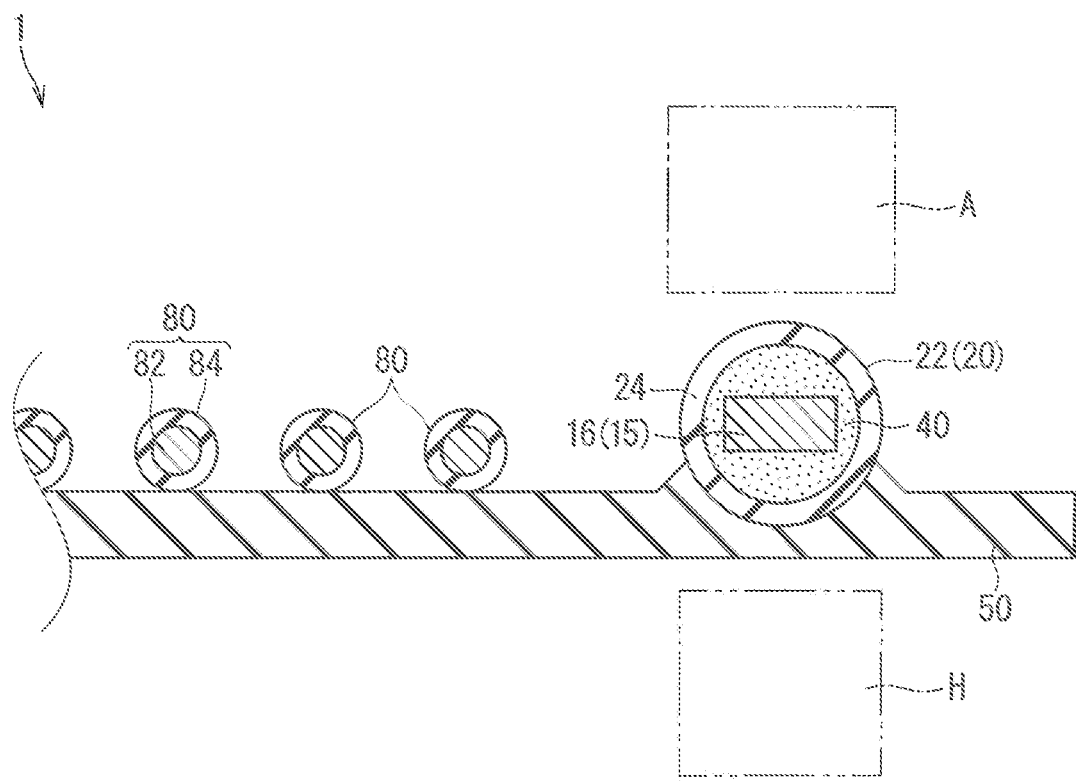
FIG. 2 is cross-sectional view of the fixing structure cut along a II-II line in FIG. 1.

A fixing structure of a splice part according to a first embodiment is described hereinafter. FIG. 1 is a plan view illustrating a fixing structure 1 of a splice part according to the first embodiment. FIG. 2 is a cross-sectional view of the fixing structure cut along a II-II line in FIG. 1.

The fixing structure 1 of the splice part includes a plurality of electrical wires 10 and a sheet material 50. In the fixing structure 1 of the splice part, a splice part 15 formed to mutually connect the plurality of electrical wires 10 is fixed to the sheet material 50.

The electrical wire 10 is used as a wiring member connecting electrical components mounted to a vehicle. In the description herein, the electrical wire 10 is a covering wire including a core wire 12 and a covering 14 for covering the core wire 12. The core wire 12 includes one or a plurality of strands. Each strand is formed of a conductive material such as copper, copper alloy, aluminum, and aluminum alloy, for example. When the core wire 12 is made up of the plurality of strands, the plurality of strands are preferably stranded. The insulating covering 14 is formed of a resin material such as polyvinyl chloride (PVC) or polyethylene (PE) extrusion-molded around the core wire 12, for example.

The splice part 15 is formed in the plurality of electrical wires 10. The plurality of electrical wires 10 are thereby mutually connected. The splice part 15 is fixed on the sheet material 50. More specifically, a core wire exposed part 13 is formed in each electrical wire 10. The core wire exposed part 13 of the plurality of electrical wires 10 is integrally welded, thereby forming the splice part 15. The welding form is not particularly limited, however, ultrasonic welding, resistance welding, and laser welding, for example, may be appropriately set. The plurality of electrical wires 10 may be connected in a form such as a connection using a terminal other than welding.

Herein, the splice part 15 is formed so that terminals of the plurality of electrical wires 10 are mutually connected. Such a splice part 15 is also referred to as a terminal splice part 16 in some cases. The splice part 15 needs not be the terminal splice part 16. An example that the splice part 15 is not the terminal splice part 16 is described in detail hereinafter.

In the example illustrated in FIG. 1, the splice part 15 is formed so that the three electrical wires 10 are mutually connected, however, the number of the electrical wires 10 constituting one splice part 15 may be two or four or more. The plurality of electrical wires 10 constituting one splice part 15 can also be considered one electrical wire group.

The plurality of electrical wires 10 extends to one side from the splice part 15. The plurality of electrical wires 10 passes over the sheet material 50 and then extends to an outer side of the sheet material 50. However, a route of the plurality of electrical wires 10 extending from the splice part 15 is not limited thereto described above. For example, the plurality of electrical wires 10 may extend to a plurality of directions from the splice part 15. The plurality of electrical wires 10 may be branched on the sheet material 50. An end portion of the electrical wire 10 on a side opposite to the splice part 15 may be located on the sheet material 50. The end portions of the plurality of electrical wires 10 on the side opposite to the splice part 15 are considered to be connected to a connector, for example. This connector is considered to be connected to the other side connector provided in an electrical component or the other side connector provided in a wiring member extending from the electrical component.

The splice part 15 is thrilled in a stacked state in a height direction of the sheet material 50 in the plurality of electrical wires 10. The plurality of electrical wires 10 extend on the sheet material 50 in a stacked state in the height direction of the sheet material 50. However, a positional relationship of the plurality of electrical wires 10 is not limited thereto described above. It is also applicable that the plurality of electrical wires 10 are not stacked in the height direction of the sheet material 50 but are arranged in a parallel state in a plane direction of the sheet material 50 to form the splice part 15. It is also applicable that the plurality of electrical wires 10 are not stacked in the height direction of the sheet material 50 but extend on the sheet material 50 in a parallel state in the plane direction of the sheet material 50.

The splice part 15 is provided with a wrapping material 20. Accordingly, the fixing structure 1 of the splice part further includes the wrapping material 20. In FIG. 1, the wrapping material 20 is illustrated by a dashed-two dotted line. The fixing structure 1 of the splice part needs not include the wrapping material 20. An example that the wrapping material 20 is not included is described in detail hereinafter.

The wrapping material 20 wraps a whole periphery of the splice part 15. The wrapping material 20 is a member formed separately from the sheet material 50.

A tube-like member 22 is used as the wrapping material 20. The tube-like member 22 is a member molded into a tube-like shape. The splice part 15 is housed inside the tube-like member 22. Herein, housed inside the tube-like member 22 are the core wire exposed part 13 and the covering 14 in the electrical wire 10 in addition to the splice part 15. The tube-like member 22 needs not be used as the wrapping material 20. An example that the tube-like member 22 is not used is described in detail hereinafter.

The tube-like member 22 includes an annular part 24 surrounding the periphery of the splice part 15 and opened on both end portions and a bottom part 26 covering one end portion of the annular part 24. Accordingly, the tube-like member 22 is a member in which the end portion on a side opposite to the bottom part 26 is opened, and houses the splice part 15 therein through the opening. At this time, a position of an edge portion of the opening of the tube-like member 22 is a position of the covering 14 of the electrical wire 10. The tube-like member 22 is a member integrally molded into a shape having the annular part 24 and the bottom part 26. The tube-like member 22 is considered an injection molding product made up of a material such as rubber, soft resin, or rigid resin, for example.

It is not necessary for the tube-like member 22 to include the bottom part 26. There may be a case where the tube-like member 22 does not include the bottom part 26. That is to say, the tube-like member 22 is also considered a member with its both end portions opened.

Even in the case where the tube-like member 22 includes the bottom part 26, it is not necessary that the tube-like member 22 is a member integrally molded into a shape having the annular part 24 and the bottom part 26. For example, it is also considered that a stopper member separately molded is attached to a cylindrical annular part with both end portion opened to be a bottom part. For example, one end portion of a cylindrical annular part with both end portions opened is crushed to be a bottom part. Also considered as the cylindrical annular part with the both end portions opened is an injection molding product made up of soft resin or rigid resin, an extrusion molding product or a thermal compression tube, for example. A resin molding product or a hardened adhesive agent, for example, is considered as a stopper member separately molded and subsequently attached to the cylindrical annular part with the both end portions opened. The adhesive agent is also considered the same member as a waterproof agent 40 described hereinafter or a member different from the waterproof agent 40.

Herein, the water proof agent 40 is provided inside the tube-like member 22. Accordingly, the fixing structure 1 of the splice part further includes die waterproof agent 40. The waterproof agent 40 is omitted in FIG. 1.

The waterproof agent 40 is a member provided in a housing space of the splice part 15 to waterproof the housing space of the splice part 15. For example, the waterproof agent 40 is a member provided on the periphery of the splice part 15 to fill a gap of the housing space of the splice part 15 in a state of being softened and having flowability, and subsequently hardened, thereby keeping a state of filling the gap. The waterproof agent 40 is provided, thus a water splash on the splice part 15 can be suppressed.

A material of the waterproof agent 40 is not particularly limited, however, various materials which can be hardened after being provided in the housing space in the state of having flowability can be used. Various types of resin such as silicon type, acrylic type, urethane type, poly-amide type, and epoxy type, for example, can be used as a typical waterproof agent 40. The hardening form of the waterproof agent 40 is not particularly limited, however, materials having various hardening form such as a material hardened by cooling such as thermoplastic resin, a material hardened by heating such as thermoset resin, a material hardened by two-liquid mixing, a material hardened by moisture, or a material hardened by ultraviolet, for example, can be used as the waterproof agent 40. The hardening form is normally set in accordance with the material.

It is sufficient that the waterproof agent 40 is firmly attached to the periphery of the covering 14 housed inside the tube-like member 22 in a liquid-tight form, for example. At this time, the waterproof agent 40 may be or may not be bonded to the covering 14.

The waterproof agent 40 also has a function of maintaining a state where the splice part 15 is housed in the tube-like member 22. At this time, the waterproof agent 40 is hardened to have a shape of surrounding the splice part 15 and the plurality of electrical wires 10 around the splice part 15, thus the splice part 15 is prevented from coming out of the waterproof agent 40. The waterproof agent 40 can be bonded to the tube-like member 22 or a protrusion allowing the waterproof agent 40 hardened inside the tube-like member 22 not to come out of the tube-like member 22, is formed in the tube-like member 22, thus the waterproof agent 40 is prevented from coming out of the tube-like member 22. Accordingly, the waterproof agent 40 can maintain the state where the splice part 15 is housed in the tube-like member 22.

An adhesive tape, for example, may be adopted as a member maintaining the state where the splice part 15 is housed in the tube-like member 22. In this case, the adhesive tape is wound around the tube-like member 22 and the electrical wire 10 extending from the open ng of the tube-like member 22 in the state where the splice part 15 is housed in the tube-like member 22, thus the state where the splice part 15 is housed in the tube-like member 22 can be maintained.

when the tube-like member 22 is a thermal compression tube, for example, a member maintaining the state where the splice part 15 is housed in the tube-like member 22 can be omitted.

The splice part 15 is fixed to the sheet material 50. Herein, the wrapping material 20 wrapping the splice part 15 is fixed to the sheet material 50, thus the splice part 15 is fixed to the sheet material 50.

The material constituting the sheet material 50 is not particularly limited, but may contain resin such as PVC, PE, polyethylene terephthalate (PET), polypropylene (PP), or polyamide (PA), for example, or may also contain metal such as aluminum or copper. A structure of the sheet material 50 is not particularly limited, however, a fiber material having fibers such as a contexture, a knitting, and a non-woven cloth, for example, may be applicable, and a non-fiber material which does not have fibers such as a member made up by extrusion molding or injection molding may also be applicable. When the sheet material 50 is a non-woven fiber material made up by extrusion molding or injection molding, a foam made up by foam molding or a solid material which is not foam-molded but is uniformly solid may also be applicable.

The sheet material 50 may have a single layer or a plurality of layers. When the sheet material 50 has a plurality of layers, a material and a structure in each layer can be appropriately set. For example, the sheet material 50 may be made up of a resin layer and a resin layer overlapped with each other, a resin layer and a metal layer overlapped with each other, or a metal layer or a metal layer overlapped with each other. The sheet material 50 may be made up of a non-fiber material layer and a non-fiber material layer overlapped with each other, a non-fiber material layer and a fiber material layer overlapped with each other, or a fiber material layer and a fiber material layer overlapped with each other.

Hereto, the sheet material 50 is formed into a quadrangular shape, however, this configuration is not necessary. The sheet material 50 may have the other shape such as a trapezoidal shape, a parallelogram shape, or a square shape, for example.

A portion of the plurality of electrical wires 10 away from the splice part 15 is fixed to the sheet material 50 in addition to the splice part 15. Herein, the portion of the plurality of electrical wires 10 away from the splice part 15 is a portion thereof which is not housed in the wrapping material 20.

A wire-like transmission member 80 is fixed to the sheet material 50 in addition to the splice part 15. Accordingly, the fixing structure 1 of the splice part further includes the wire-like transmission member 80.

The wire-like transmission member 80 is a member provided separately from the plurality of electrical wires 10. The splice part 15 is not formed in a portion of the wire-like transmission member 80 disposed on the sheet material 50. In other words, the splice part 51 is not formed in the wire-like transmission member 80, or the splice part 51 is formed in the wire-like transmission member 80 but is not disposed on the sheet material 50. The wire-like transmission member 80 in which the splice part 15 is formed and the splice part 15 is fixed on the sheet material 50 is deemed as the electrical wire 10 described above.

It is sufficient that the wire-like transmission member 80 is a wire-like member transmitting electrical power or light. For example, the wire-like transmission member 80 may be a general wire having a core wire 82 and a covering 84 around the core wire 82, or may also be a bare conductive wire, a shielded wire, an enamel wire, a nichrome wire, or an optical fiber.

The wire-like transmission member 80 transmitting the electrical power may be various kinds of signal lines or various kinds of power lines. The wire-like transmission member 80 transmitting the electrical power may be used as an antenna or coil, for example, transmitting or receiving a signal or electrical power to or from a space.

In the example illustrated in FIG. 1, the five wire-like transmission members 80 are provided, however, this configuration is not necessary. The number of the wire-like transmission members 80 may be one to four, or six or more, and can be appropriately set in accordance with the number of the circuits of the wiring member.

In the example illustrated in FIG. 1, an intermediate portion of the wire-like transmission member 80 is fixed on the sheet material 50 and an end portion thereof extends to the outer side of the sheet material 50, however, this configuration is not necessary. The end portion of the wire-like transmission member 80 may also be located on the sheet material 50.

In the example illustrated in FIG. 1, the plurality of wire-like transmission members 80, and also the wire-like transmission member 80 and the electrical wire 10 extend straight in parallel to each other on the sheet material 50, however, this configuration is not necessary. For example, it is also applicable that the plurality of wire-like transmission members 80 or the wire-like transmission member 80 and the electrical wire 10 intersect with each other, the wire-like transmission member 80 is curved and disposed sheet material 50, or a branch is formed, thus the route of the wire-like transmission member 80 can be appropriately set.

The electrical wire 10, the wrapping material 20, and the wire-like transmission member 80 are fixed to the sheet material 50. The electrical wire 10, the wrapping material 20, and the wire-like transmission member 80 are collectively referred to as the fixing target members 10, 20, and 80 hereinafter. At this time, each fixing state of fixing the fixing target members 10, 20, and 80 to the sheet material 50 is not particularly limited. Applicable as the above fixing state are a contact area fixation and a non-contact area fixation, or both fixations may be used together. Herein, the contact area fixation indicates that a portion where the sheet material 50 and the fixing target members 10, 20, and 80 have contact with each other is stuck and fixed. The non-contact area fixation indicates the fixing state which is not the contact area fixation. For example, a sewing thread, the other sheet material 50 or an adhesive tape presses the fixing target members 10, 20 and 80 toward the sheet material 50, or surrounds the fixing target members 10, 20, and 80 and the sheet material 50 to sandwich them, thereby keeping them in the fixing state. In the description hereinafter, the fixing target members 10, 20, and 80 and the sheet material 50 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area, indirect fixation indicates that the fixing target members 10, 20, and 80 and the sheet material 50 are indirectly stuck and fixed via an intervening member such as an adhesive agent, a gluing agent, a double-sided adhesive tape, and a hook and loop fastener provided therebetween. The contact area direct fixation indicates that the fixing target members 10, 20, and 80 and the sheet material 50 are directly stuck and fixed without an intervention of the adhesive agent, for example, which is separately provided. Considered in the contact area direct fixation is that resin included in at least one of the fixing target members 10, 20, and 80 and the sheet material 50 is melted, thus the fixing target members 10, 20, and 80 and the sheet material 50 are stuck and fixed, for example. In the description hereinafter, the fixing target members 10, 20, and 80 and the sheet material 50 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the fixing target members 10, 20, and 80 and the sheet material 50 are in the state of the contact area direct fixation by these means. Specifically, when the state of the contact area direct fixation is formed by the ultrasonic welding, for example, the fixing target members 10, 20, and 80 and the sheet material 50 are in the state of the contact area direct fixation by the ultrasonic welding. A portion where the state of the contact area direct fixation by the heat is formed by the welding (a fixing portion between the fixing target members 10, 20, and 80 and the sheet material 50) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the fixing target members 10, 20, and 80 may be melted, or only the resin included in the sheet material 50 may be melted. In these cases, the resin which has been melted is stuck on an outer surface of the resin on the other side, and a relatively clear interface may be formed in some cases. In the case of the contact area direct fixation, both the resin included in the fixing target members 10, 20, and 80 and the resin included in the sheet material 50 may be melted. In this case, there may be a case where both the resins are mixed and a clear interface is not formed. Particularly, when the fixing target members 10, 20 and 80 and the sheet material 50 include compatible resin such as the same resin material, for example, there may be a case where both the resins are mixed and a clear interface is not formed.

For example, when the sheet material 50 and the fixing target members 10, 20, and 80 are fixed by ultrasonic welding, it is considered that the sheet material 50 and the fixing target members 10, 20, and 80 are sandwiched between a horn H and an anvil A, which are a ultrasonic welding machine, and ultrasonic vibration is provided by the horn H. A material, of at least one of the sheet material 50 and the fixing target members 10, 20, and 80 is melted by frictional heat generated in an interface between the sheet material 50 and the fixing target members 10, 20, and 80, thus the sheet material 50 and the fixing target members 10, 20, and 80 are fixed to each other. At this time, FIG. 2 illustrates the example that the sheet material 50 and the wrapping material 20 are sandwiched between the horn H and the anvil A of the ultrasonic welding machine to be ultrasonic.

The fixing target members 10, 20, and 80 fixed to the sheet material 50 by the contact area direct fixation preferably include the same material as the sheet material 50. Particularly, a resin composition as a material of the fixing target members 10, 20, and 80 and a resin composition as a material of the sheet material 50 preferably has the same resin as a main component.

The fixing states of the sheet material 50, the electrical wire 10, the wrapping material 20, and the wire-like transmission member 80 may be totally the same or may be different from each other. At this time, the fixing state of the sheet material 50 and the wrapping material 20, the fixing state of the sheet material 50 and the electrical wire 10, and the fixing state of the sheet material 50 and the wire-like transmission member 80 may be totally different from each other. It is also applicable that the fixing state of the sheet material 50 and the wrapping material 20 and the fixing state of the sheet material 50 and the electrical wire 10 are the same as each other, and only the fixing state of the sheet material 50 and the wire-like transmission member 80 is different from the other two fixing states. It is also applicable that the fixing state of the sheet material 50 and the wrapping material 20 and the fixing state of the sheet material 50 and the wire-like transmission member 80 are the same as each other, and only the fixing state of the sheet material 50 and the electrical wire 10 is different from the other two fixing states, it is also applicable that the fixing state of the sheet material 50 and the electrical wire 10 and the fixing state of the sheet material 50 and the wire-like transmission member 80 are the same as each other, and only the fixing state of the sheet material 50 and the wrapping material 20 is different from the other two fixing states. At this time, any of the fixing states described above may be combined as the combination of the different types of fixing state.

Herein, in forming the fixing structure 1 of the splice part, it is applicable that the wrapping material 20 is fixed to the splice part 15 in advance and then the wrapping material 20 fixed to the splice part 15 is fixed to the sheet material 50, or the sheet material 50 and the wrapping material 20 are fixed to each other in advance and then the splice part 15 is housed inside the wrapping material 20 fixed to the sheet material 50. In the former case, the splice part 15 with the wrapping material 20 in which the wrapping material 20 is fixed to the splice part 15 can be manufacture as is conventionally done.

According to the fixing structure 1 of the splice part having the above configuration, the splice part 15 is fixed to the sheet material 50, thus the splice part 15 can be fixed without winding the splice part 15 around an electrical wire bundle by an adhesive tape.

The portion of the electrical wire 10 away from the splice part 15 is fixed to the sheet material 50 in addition to the splice part 15, thus the splice part 15 and the other portion of the electrical wire 10 can be positioned.

The wire-like transmission member 80 is fixed to the sheet material 50 in addition to the splice part 15, thus the splice part 15 and the other wire-like transmission member 80 can be positioned.

The fixing structure 1 further includes the wrapping material 20 wrapping the splice part 15, thus the wrapping material 20 can be fixed to the sheet material 50 after the splice part 15 is wrapped by the wrapping material 20.

The tube-like member 22 is adopted as the wrapping material 20, thus the splice part 15 with the tube-like member 22 can be fixed to the sheet material 50.

The wrapping material 20 and the sheet material 50 are fixed to each other by the contact area direct fixation, thus the wrapping material 20 can be fixed to the sheet material 50 without using the other member.

The wrapping material 20 and the sheet material 50 are made up of the same material, thus a fixing strength of the contact area direct fixation between the sheet material 50 and the wrapping material 20 can be increased easily.

Second Embodiment

Figure 3:
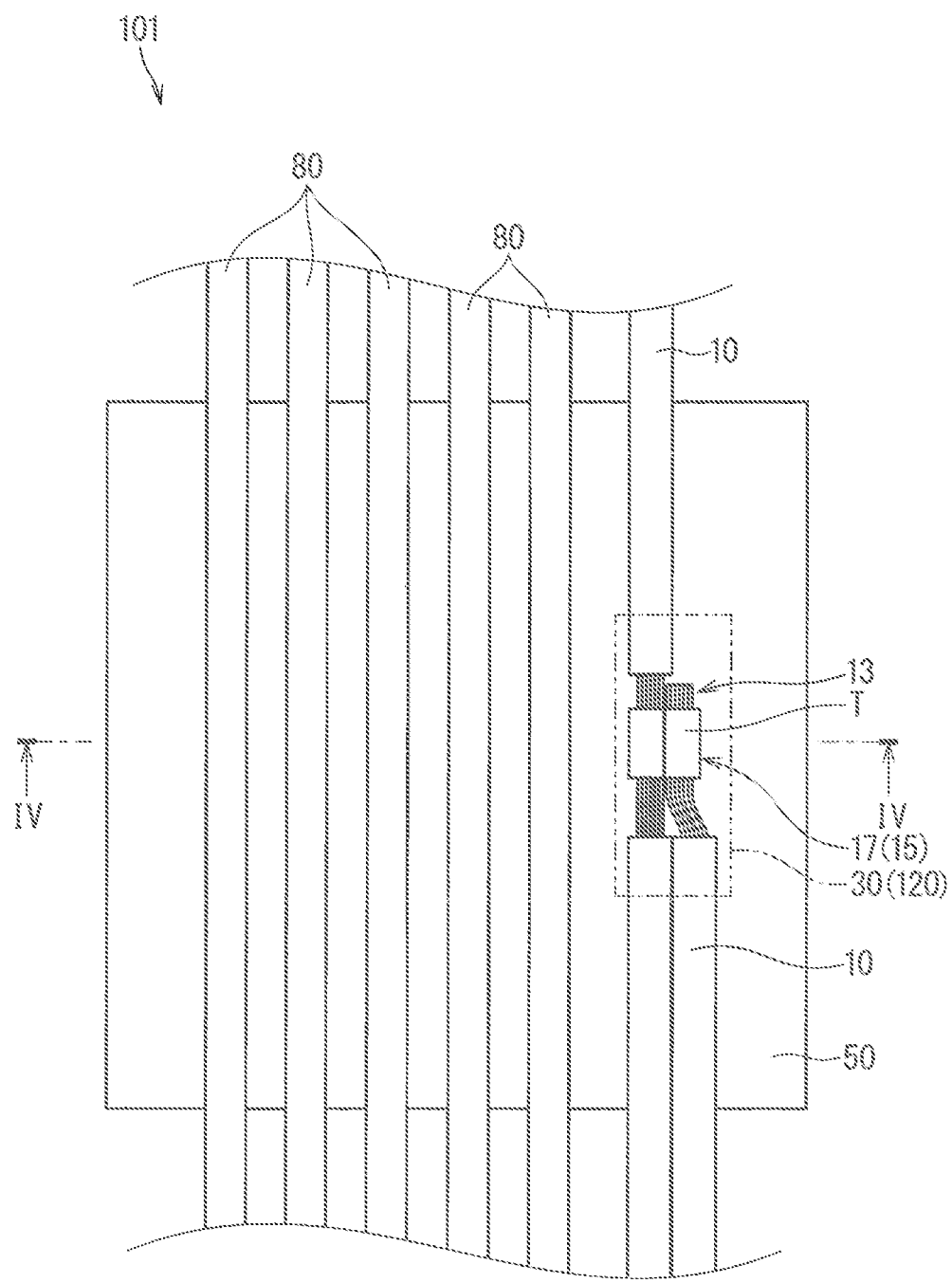
FIG. 3 is a plan view illustrating a fixing structure of a splice part according to a second embodiment.
Figure 4:
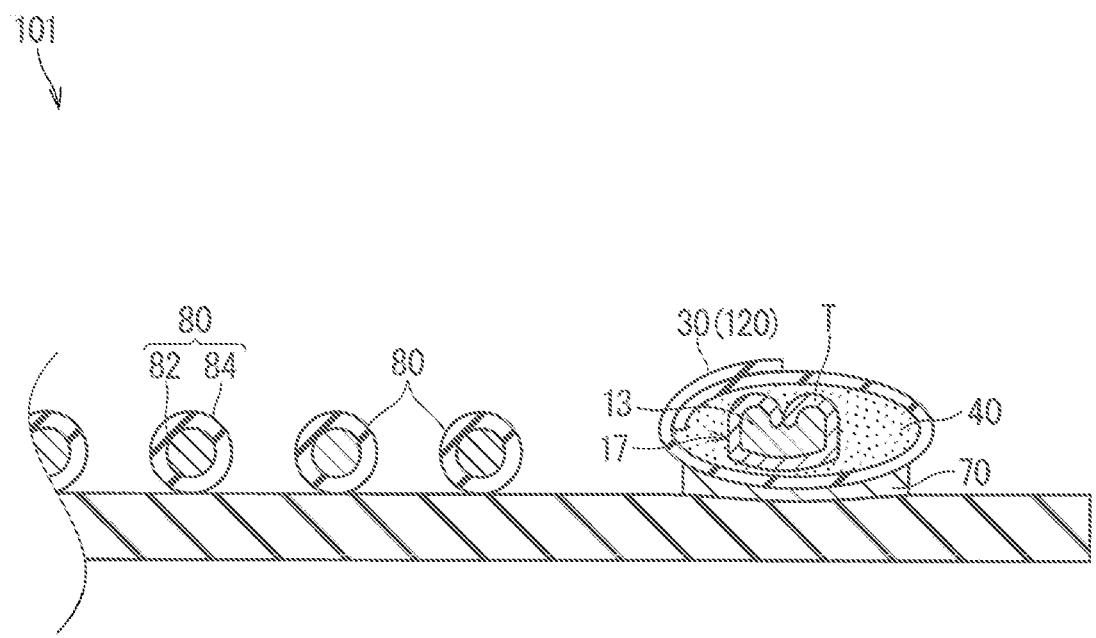
FIG. 4 is a cross-sectional view of the fixing structure cut along a IV-IV line in FIG. 3.

A fixing structure of a splice part according to a second embodiment is described. FIG. 3 is a plan view illustrating a fixing structure 101 of the splice part according to the second embodiment. FIG. 4 is a cross-sectional view of the fixing structure 101 cut along a IV-IV line in FIG. 3. In the description of the present embodiment, the same reference numerals are assigned to the similar constituent elements described above, and the description thereof will be omitted. The same applies to the description of each embodiment and modification example hereinafter.

In the fixing structure 101 of the splice part according to the second embodiment, a wrapping material 120 is different from the wrapping material 20 in the fixing structure 1 of the splice part according to the first embodiment.

A winding piece 30 is adopted as the wrapping material 120. In FIG. 3, the winding piece 30 is illustrated by a dashed-two dotted line. The winding piece 30 is formed separately from the sheet material 50. The winding piece 30 is wound around the splice part 15 to wrap the splice part 15. In the example illustrated in FIG. 4, the winding piece 30 is wound in a form of sushi roll. The winding state of the winding piece 30 is not limited to the form of sushi roll, however, the winding piece 30 may be wound in the other them such as a form of rafter, for example.

An adhesive tape, a film, or a thermal compression film, for example, can be adopted as the winding piece 30. The same type of base material as the sheet material 50 can also be adopted as the winding piece 30.

Herein, the winding piece 30 is wound to reach the portion of the covering 14 in the electrical wire 10.

The waterproof agent 40 is provided inside the winding piece 30 as with the first embodiment. The waterproof agent 40 is omitted in FIG. 3. The waterproof agent 40 fills a gap between the splice part 15 and the winding piece 30. At this time, it is sufficient that the waterproof agent 40 is firmly attached to the periphery of the covering 14 housed inside the winding piece 30 in a liquid-tight form, for example. It is sufficient that the waterproof agent 40 can be bonded to the covering 14. Accordingly, a gap is hardly generated between the covering 14 and the waterproof agent 40.

The waterproof agent 40 also has a function of maintaining a state where the winding piece 30 is wound around the splice part 15. At this time, the waterproof agent 40 can be bonded to the winding piece 30, thus can maintain the state where the splice part 15 is housed in the tube-like member 22.

When the winding piece 30 is an adhesive tape or a thermal compression film, for example, the winding piece 30 itself can maintain the state where the winding piece 30 is wound around the splice part 15. Thus, a member for maintaining the state where the winding piece 30 is wound around the splice part 15 can be omitted.

In the fixing structure 101 of the splice part according to the second embodiment, the fixing state of the wrapping material 120 and the sheet material 50 is different from the fixing state of the wrapping material 20 and the sheet material 50 in the fixing structure 1 of the splice part according to the first embodiment.

Herein, the winding piece 30 as the wrapping material 120 is fixed to the sheet material 50 by the contact area indirect fixation using an intervening member 70. An adhesive agent, a double-sided adhesive tape, and a hook and loop fastener, for example, can be adopted as the intervening member 70.

As a matter of course, the fixing state of the sheet material 50 and the winding piece 30 may be a fixing state other than the contact area indirect fixation, thus the contact area direct fixation may also be applicable as with the first embodiment. In this case, it is sufficient that the sheet material 50 and an outer surface of the winding piece 30 are made of the same material.

In the fixing structure 101 of the splice part according to the second embodiment, the structure of the splice part 15 is different from the fixing structure 1 of the splice part in the fixing structure 1 of the splice part according to the first embodiment.

An intermediate splice part 17 is adopted herein as the splice part 15. The intermediate splice part 17 is formed in a manner that an intermediate portion of at least one electrical wire 10 is connected to the other electrical wire 10.

A terminal T is adopted as a means of connecting the plurality of electrical wires 10 in the splice part 15. The one terminal T is pressure-bended to the core wire exposed part 13 to connect the plurality of electrical wires 10. However, even when the plurality of electrical wires 10 are connected by the terminal T, the configuration of connecting them by pressure bonding is not necessary. For example, it is also considered that the plurality of electrical wires 10 are connected by welding the core wire exposed part 13 of the plurality of electrical wires 10 to one terminal T. In the example illustrated in FIG. 3, the terminal T has a core wire pressure bonding part pressure-bonded to the core wire exposed part 13 and does not have a covering pressure bonding part pressure-bonding to the covering 14, however, the terminal T needs not have the covering pressure bonding part.

According to the fixing structure 101 of the splice part having the above configuration, the winding piece 30 is adopted as the wrapping material 120, thus the splice part 15 with the winding piece 30 can be fixed to the sheet material 50.

The wrapping material 120 and the sheet material 50 are fixed by the contact are indirect fixation, thus the wrapping material 120 can be simply fixed to the sheet material 50 even if there is no facility for performing the contact area direct fixation.

Third Embodiment

Figure 5:
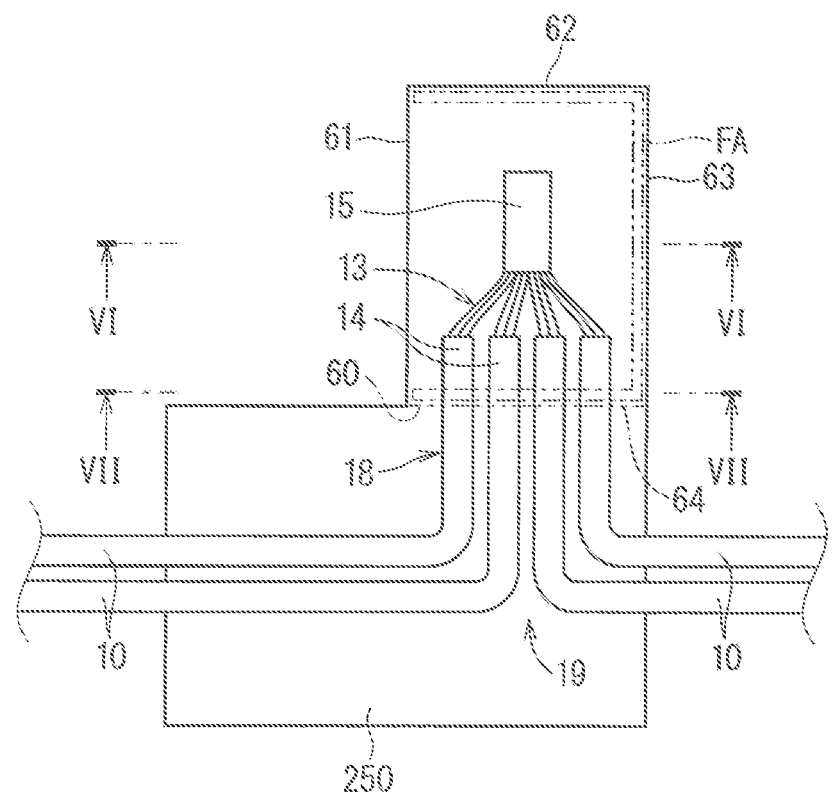
FIG. 5 is a plan view illustrating a fixing structure of a splice part according to a third embodiment.
Figure 6:
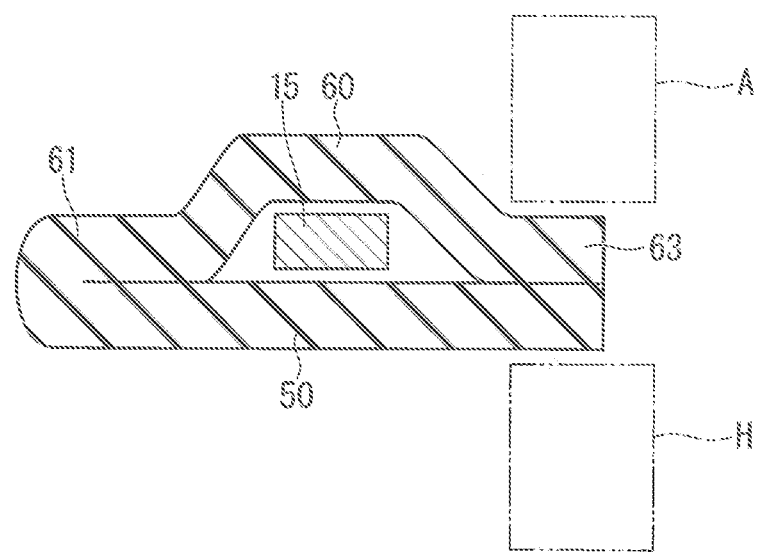
FIG. 6 is a cross-sectional view of the fixing structure cut along a VI-VI line in FIG. 5.
Figure 7:
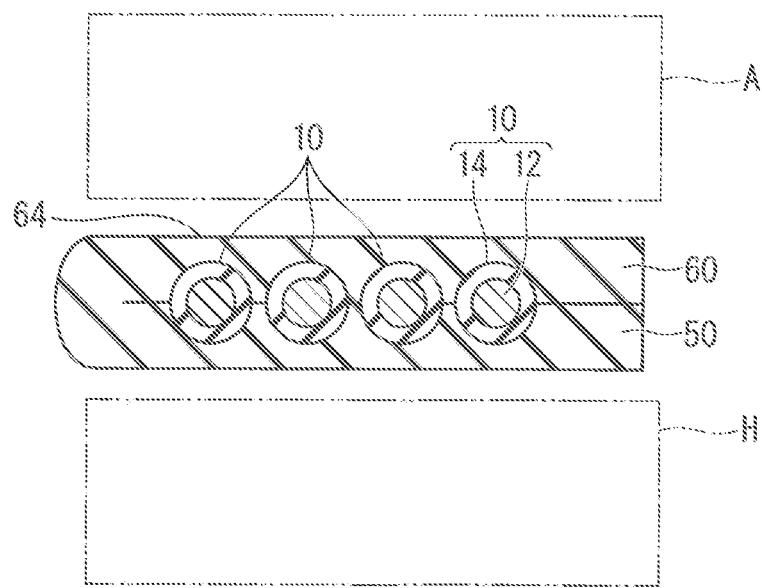
FIG. 7 is a cross-sectional view of the fixing structure cut along a VII-VII line in FIG. 5.
Figure 8:
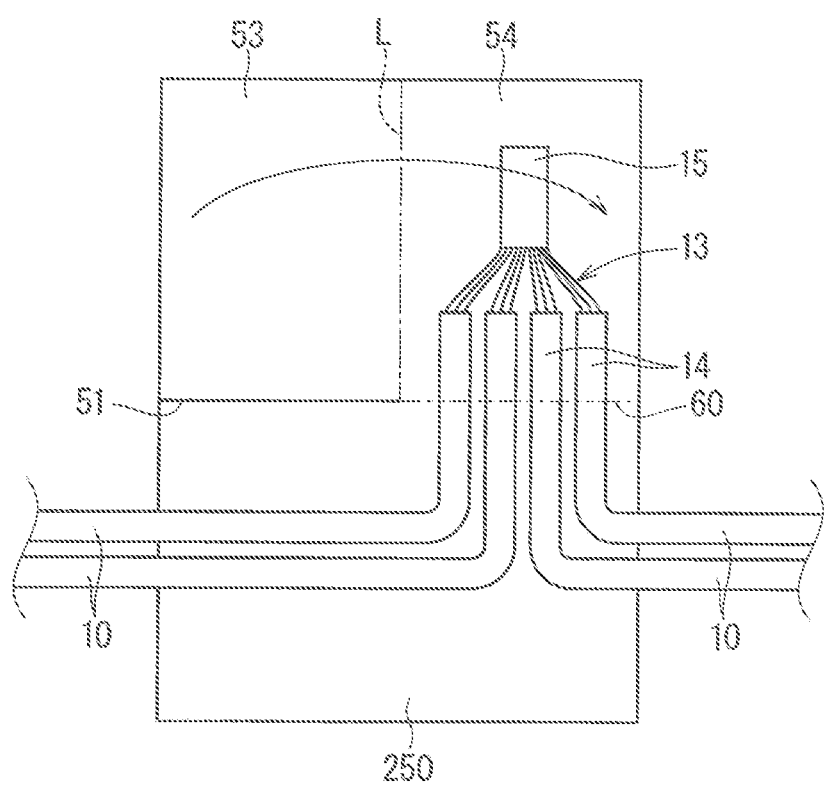
FIG. 8 is an explanation drawing illustrating the fixing structure of the splice part according to the third embodiment.

A fixing structure of a splice part according to a third embodiment is described. FIG. 5 is a plan view illustrating a fixing structure 201 of the splice part according to the third embodiment. FIG. 6 is a cross-sectional view of the fixing structure 201 cut along a VI-VI line in FIG. 5. FIG. 7 is a cross-sectional view of the fixing structure 201 cut along a VII-VII line in FIG. 5. FIG. 8 is an explanation drawing illustrating the fixing structure 201 of the splice part according to the third embodiment.

The fixing structure 201 of the splice part according to the third embodiment is different from the fixing structure 1 of the splice part according to the first embodiment in that the wrapping material 20 is omitted and the fixing structure 201 further includes a sandwiching piece 60 in place of the wrapping material 20. The fixing structure 1 of the splice part according to the third embodiment is different from the fixing structure 1 of the splice part according to the first embodiment in that the electrical wires 10 extending from the splice part 15 are not stacked.

The sandwiching piece 60 is fixed to a sheet material 250 in a state of sandwiching the splice part 15 between the sandwiching piece 60 and the sheet material 250. In the example illustrated in FIG. 5, the sandwiching piece 60 is illustrated by a dashed-two dotted line.

The sandwiching piece 60 is provided to cover the covering 14 of the electrical wires 10 extending from the splice part 15 in addition to the splice part 15. A peripheral edge portion of the sandwiching piece 60 is fixed to the sheet material 250. At this time, the covering 14 is sandwiched by the sheet material 250 and the sandwiching piece 60 and fixed to the sheet material 250, thus the splice part 15 is fixed to the sheet material 250. Accordingly, the splice part 15 is not directly fixed to the sheet material 250. As a matter of course, the splice part 15 may be directly fixed to the sheet material 250.

The sandwiching piece 60 is formed by partially folding back the sheet material 250 as illustrated in FIG. 8. Herein, the sandwiching piece 60 is formed by folding the sheet material 250 in two. Herein, a slit 51 is provided in the sheet material 250. The slit 51 extends from an intermediate portion of one edge portion of the quadrangular sheet material 250 toward an end portion on an opposite side thereof. A first piece 53 on one side of the slit 51 is a portion to be the sandwiching piece 60. A second piece 54 on an opposite side of a fold line L, which extends from one end portion of the slit 51, from the first piece 53 is a portion sandwiching the splice part 15 with the first piece 53. That is to say, the first piece 53 on one lateral side of the slit 51 is folded back along the fold line L extending from one end portion of the slit 51, thereby being overlapped with the second niece 54 of the sheet material 250, and becomes the sandwiching piece 60. This fold line L extends in a direction parallel to an extension direction of the electrical wire 10 extending from the splice part 15. The sandwiching piece 60 and the sheet material 250 are fixed to each other in three edge portions 62, 63, and 64 except for an edge portion 61 which becomes the fold line L in the sandwiching piece 60. This fixing portion is indicated as a fixing region FA in FIG. 5. As a matter of course, the sandwiching piece 60 and the sheet material 250 may be fixed to each other also in the edge portion di which becomes the fold line L.

A portion of the electrical wire 10 extending from the splice part 15 extends to an outer side of the sandwiching piece 60 from between the edge portion 64 of the sandwiching piece 60 and the sheet material 250. At this time, the plurality of electrical wires 10 are not stacked in a height direction of the sheet material 250 between the edge portion 64 of the sandwiching piece 60 and the sheet material 250 but are arranged in a plane direction of the sheet material 250 to form a parallel part 18. The adjacent electrical wires 10 are arranged at intervals in the parallel part 18. At least one of the sheet material 250 and the sandwiching piece 60 fills a gap between the adjacent electrical wires 10 in the parallel part 18. Accordingly, when one electrical wire 10 in the parallel part 18 is seen, a whole periphery of the one electrical wire 10 is surrounded by the sheet material 250 and the sandwiching piece 60. In the example illustrated in FIG. 7, irregularities caused by sandwiching the electrical wire 10 are not formed in outer surfaces of the sheet material 250 and the sandwiching piece 60, however, there may also be a case where the irregularities caused by sandwiching the electrical wire 10 are formed in the outer surface of the sheet material 250 or sandwiching piece 60 or the outer surfaces of both the sheet material 250 and the sandwiching piece 60.

The sandwiching piece 60 and the sheet material 250 are fixed to each other in the contact area direct fixation herein. A housing space component part constituting a housing space of the splice part 15 in the sheet material 250 and the sandwiching piece 60 and a portion of the electrical wire 10 constituting the splice part 15 having contact with the housing space component part are fixed by a contact area direct fixation in a liquid-tight form. Accordingly, the housing space of the splice part 15 between the sandwiching piece 60 and the sheet material 250 can be waterproofed without the waterproof agent 40.

More specifically, the edge portion 61 of the sandwiching piece 60 is linked to the sheet material 250, thus ingress of water can be prevented.

When the edge portions 62 and 63, in the edge portions 62, 63, and 64 of the sandwiching piece 60 fixed to the sheet material 250, from which the electrical wire 10 does not extend are seen, the sheet material 250 and the sandwiching piece 60 are continuously fixed along the edge portions 62 and 63 by the contact area direct fixation. Accordingly, the contact area direct fixation is achieved in a liquid-tight form in the edge portions 62 and 63.

When the edge portion 64, in the edge portions 62, 63, and 64 of the sandwiching piece 60 fixed to the sheet material 250, from which the electrical wire 10 extends is seen, the sheet material 250 and the sandwiching piece 60 are fixed by the contact area direct fixation in a lateral portion of the electrical wire 10 (a portion not overlapped with the electrical wire 10). In a portion overlapped with the electrical wire 10, the portion where the sandwiching piece 60 and the covering 14 of the electrical wire 10 have contact with each other is fixed in the contact area direct fixation and a portion where the sheet material 250 and the covering 14 of the electrical wire 10 have contact with each other is fixed by the contact area direct fixation on a side opposite to the sandwiching piece 60. In the edge portion 64, the sheet material 250, the sandwiching piece 60, and the covering 14 are continuously fixed to each other by the contact area direct fixation along the edge portion 64. Accordingly, the contact area direct fixation is achieved in a liquid-tight form in the edge portion 64.

At this time, even when the sandwiching piece 60, the sheet material 250, and the covering 14 of the electrical wire 10 are fixed by the contact area direct fixation so that the interface is generated therebetween, they can be fixed in a liquid-tight form as long as they are firmly attached to each other. However, when the sandwiching piece 60, the sheet material 250, and, the covering 14 of the electrical wire 10 are integrated with each other to the extent that a clear interface is not generated therebetween, they can be fixed in a liquid-tight form more reliably. At this time, it is preferable that the sheet material 250, the sandwiching piece 60, and the covering 14 of the electrical wire 10 has the same material in the portion of the contact area direct fixation. Accordingly, the sandwiching piece 60, the sheet material 250, and the covering 14 of the electrical wire 10 can be fixed by the contact area direct fixation in a liquid-tight form.

The housing space of the splice part 15 between the sandwiching piece 60 and the sheet material 250 may be waterproofed by the waterproof agent 40. In this case, the housing space component part constituting the housing space of the splice part 15 in the sheet material 250 and the sandwiching piece 60 and the portion of the electrical wire 10 constituting the splice part 15 having contact with the housing space component part needs not be fixed by the contact area direct fixation in a liquid-tight form. The waterproof agent 40 may fill the gap between the adjacent electrical wires 10 in the parallel part 18 in place of the sheet material 250 and the sandwiching piece 60.

The portion of electrical wires 10 extending to the outer side of the sandwiching piece 60 is also disposed on the sheet material 250, and fixed to the sheet material 250. The fixing state of this portion is not particularly limiter, however, the contact area direct fixation and the contact area indirect fixation, for example, are appropriately set.

The portion of electrical wires 10 extending to the outer side of the sandwiching piece 60 is branched on the sheet material 250, and the branched electrical wires 10 extend in different directions, respectively. Accordingly, a branch part 19 is formed on the sheet material 250. In the example illustrated in FIG. 5, the four electrical wires 10 constitute the splice part 15, and every two electrical wires 10 are branched on the sheet material 250 and extend on sides opposite to each other. As a matter of course, the number of the electrical wires 10 constituting the splice part 15, a ratio of the electrical wires 10 branched and extending in the different directions, and directions in which the electrical wires 10 extend after branching are not limited thereto described above, but are appropriately set.

The wire-like transmission member 80 is omitted in the fixing structure 1 of the splice part, however, the wire-like transmission member 80 may be disposed on the sheet material 250.

According to the fixing structure 201 of the splice part having such a configuration, the splice part 15 is sandwiched between the sandwiching piece 60 and the sheet material 250, thus the sheet material 250 can be used as a part of the protection part protecting the splice part 15. The formation of the protection part and the positioning of the splice part 15 can be performed together.

The electrical wires 10 extending to the outer side from the sandwiching piece 60 constitute the parallel part 18, thus the other member can fill the gap between the electrical wires 10 easily compared with the case and the portion where the electrical wires 10 extend to the outer side in a bundle.

The sheet material 250 is folded back to form the sandwiching piece 60, thus a protection material needs not be provided separately from the sheet material 250. At this time, when the sheet material 250 is formed in a quadrangular shape, a yield can be increased when the sheet material 250 is cut out of a parent material.

The sandwiching piece 60 and the sheet material 250 are fixed to each other by the contact area direct fixation, thus can be fixed without using a fixing member such as an adhesive agent.

The sandwiching piece 60, the sheet material 250, and the covering 14 of the electrical wire 10 are fixed by the contact area direct fixation in a liquid-tight form, thus the housing space of the splice part 15 can be waterproofed using the contact area direct fixation.

When the sandwiching piece 60, the sheet material 250, and the covering 14 of the electrical wire 10 are made up of the same material, fixing strength in the contact area direct fixation can be increased easily. The contact area direct fixation can be easily achieved in a liquid-tight form.

Modification Example of Third Embodiment

Figure 9:
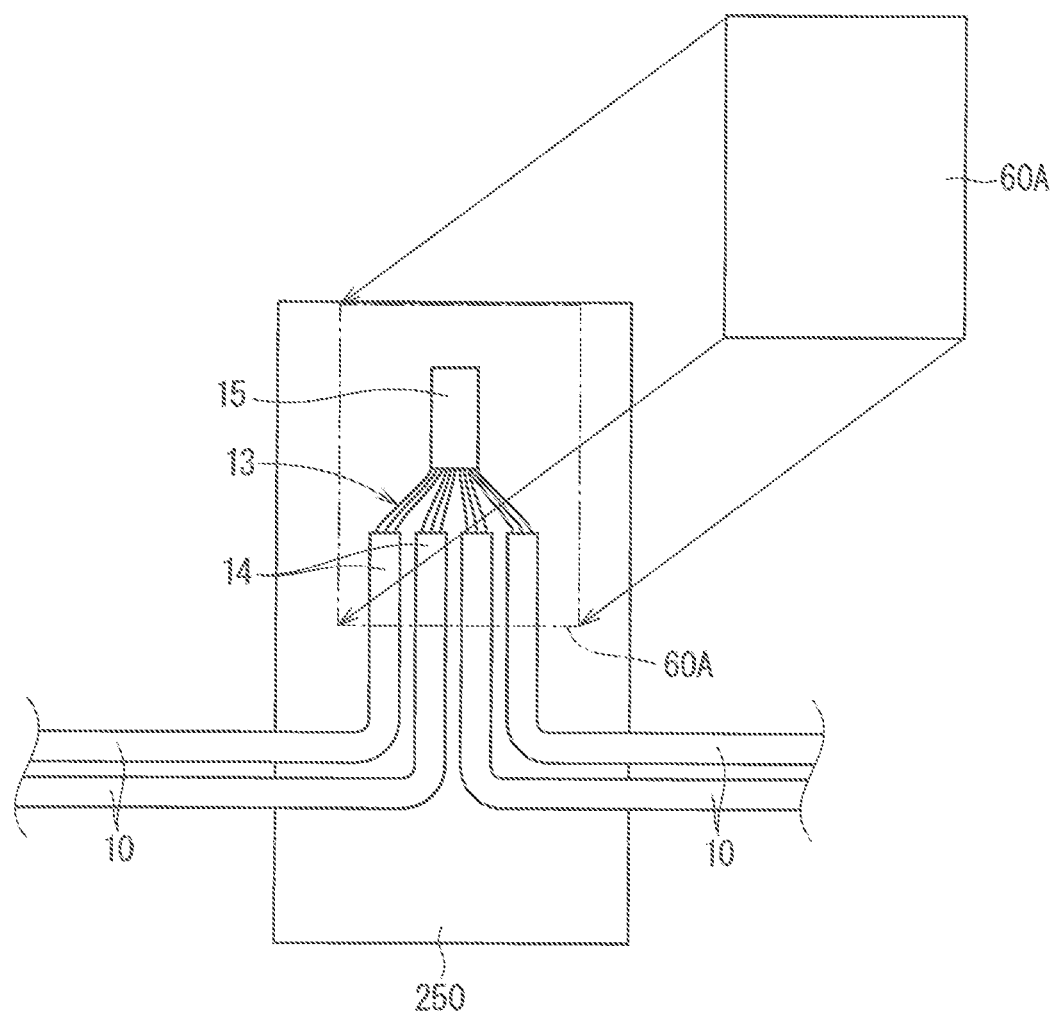
FIG. 9 is an explanation drawing illustrating a modification example of a sandwiching piece.

FIG. 9 is an explanation drawing illustrating a modification example of the sandwiching piece 60.

In the above description, the sandwiching piece 60 is formed by folding back the part of the sheet material 250, however, this configuration is not necessary. As with the example illustrated in FIG. 9, a sandwiching piece 60A may be formed separately from the sheet material 250.

When the sandwiching piece 60A is formed separately from the sheet material 250, an adhesive tape and a film, for example, can be used as the sandwiching piece 60A. The same type of base material as the sheet material 250 can also be adopted as the sandwiching piece 60A.

As described above, when the sandwiching piece 60 is formed separately from the sheet material 250, a material and a thickness of the sandwiching piece 60 can be different from those of the sheet material 250.

Even in the case where the sandwiching piece 60 is formed by folding back the part of the sheet material 250, the configuration of folding back the sheet material 250 is not limited thereto described above.

Figure 10:
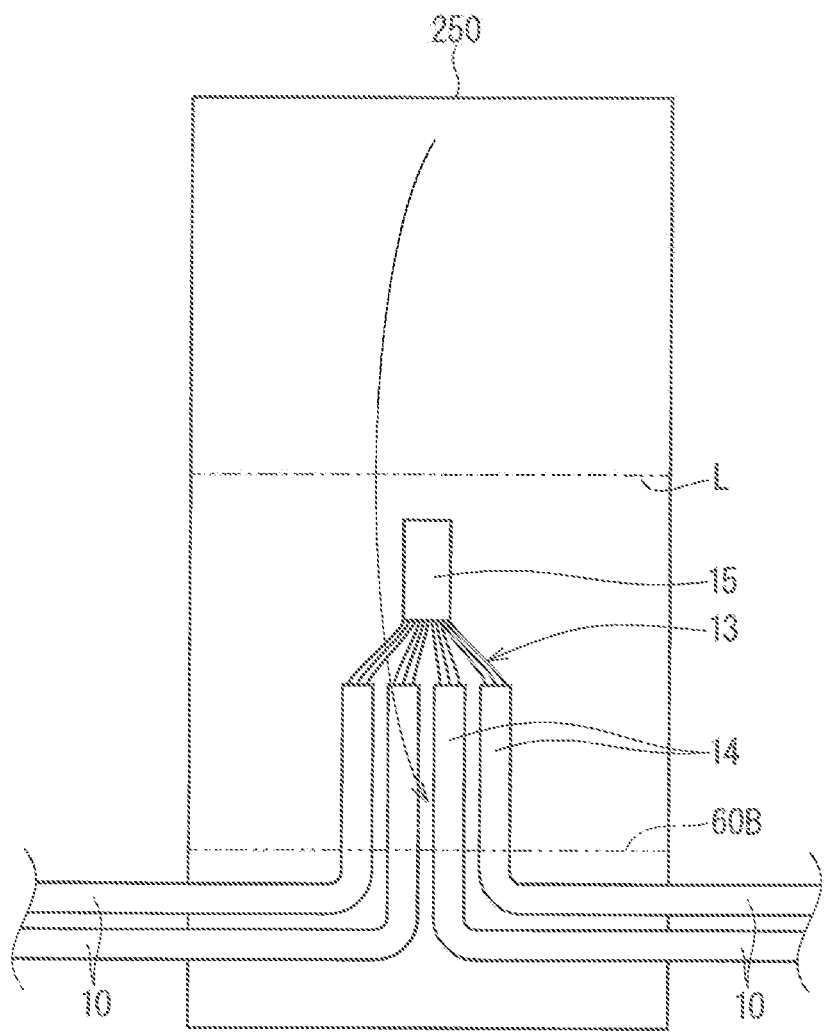
FIG. 10 is an explanation drawing illustrating a first modification example of a way to fold a sheet material.

FIG. 10 is an explanation drawing illustrating a first modification example of a way to fold the sheet material 250.

In the example described above, the sheet material 250 is folded back along the fold line L extending in the direction parallel to the extension direction of the electrical wire 10 extending from the splice part 15 to form the sandwiching piece 60, however, this configuration is not necessary. As with the example illustrated in FIG. 10, the sheet material 250 may be folded back along the fold line L extending to intersect with the extension direction of the electrical wire 10 extending from the splice pad 15 to form a sandwiching piece 60B.

When the sheet material 250 is folded back in this manner, the fold line L is located on a tip end side of the terminal splice part 16 (a side opposite to a side on which the electrical wire 10 extends from the terminal splice part 16), thus the terminal splice part 16 hardly passes to the tip end side of the terminal splice part 16 with respect to the housing space.

In the example described above, the sheet material 250 is formed into the quadrangular shape and the slit 51 is formed in the folded portion, however, this configuration is not necessary. As with the example illustrated in FIG. 10, the slit 51 needs not be formed in the folded portion in the quadrangular sheet material 250. In this case, the trouble of providing the slit 51 can be saved.

In example illustrated in FIG. 10, the sandwiching piece 60B covers the area reaching a near side of the branch part 19 where the plurality of electrical wires 10 extend in parallel from the splice part 15 and are branched, however, this configuration is not necessary. The sandwiching piece 60B may cover the area beyond the branch part 19.

Figure 11:
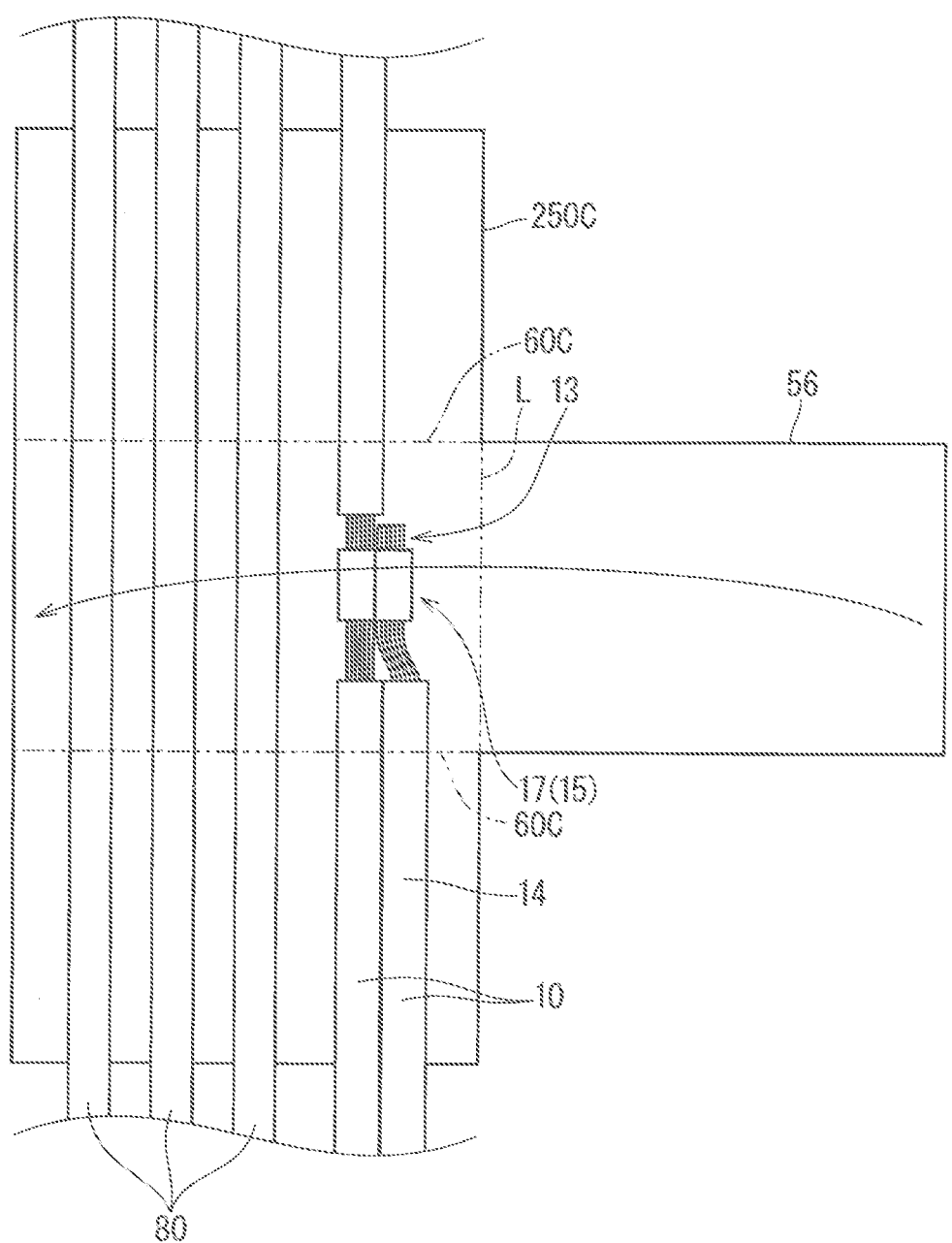
FIG. 11 is an explanation drawing illustrating a second modification example of a way to fold a sheet material.

FIG. 11 is an explanation drawing illustrating a second modification example of a way to fold the sheet material 250.

In the example described above, the sheet material 250 is folded back so that the sandwiching piece 60 is located in an end portion of the sheet material 250 in a longitudinal direction, however, this configuration is not necessary. As with the example illustrated in FIG. 11, a sheet material 250C may be folded hack so that a sandwiching piece 60C located in an intermediate portion of the sheet material 250C in the longitudinal direction.

When the sheet material 250C is folded back in this manner, in a case where the electrical wire 10 extends to both sides from the splice part 15, portions of the electrical wire 10 on the both sides away from the splice part 15 (portions not being sandwiched by the sandwiching piece 60C) can be fixed to the sheet material 250C.

In the example described above, the sheet material 250 is formed into the quadrangular shape, however, this configuration is not necessary. As with the example illustrated in FIG. 11, a portion of the sheet material 250C folded back may be formed into a convex shape in advance. That is to say, the sheet material 2500 may be formed into a shape having a convex portion 56 for folding.

When the sheet material 250C is folded back in this manner, in a case where the wire-like transmission member 80 is disposed on the sheet material 250C, a portion of the sheet material 250C where the wire-like transmission member 80 is fixed needs not be folded back.

In the example described above, the sandwiching piece 60 sandwiches only the splice part 15 and a peripheral part thereof with the sheet material 250, however, this configuration is not necessary. As with the example illustrated in FIG. 11, the sandwiching piece 60C may sandwich both the splice part 15 and the wire-like transmission member 80 with the sheet material 250C. In this case, the sandwiching piece 60C functions as a cover for covering the wire-like transmission member 80 from a side opposite to the sheet material 250C. In this case, the housing space of the splice part 15 made up of the sandwiching piece 60C and the sheet material 250C may be independent of the housing space of the wire-like, transmission member 80 or continuous therewith. Specifically, when the sandwiching piece 60C and the sheet material 250C are fixed by the contact area fixation between the splice part 15 and the wire-like transmission member 80 located adjacent to the splice part 15, the housing space of the splice part 15 and the housing space of the wire-like transmission member 80 are independently located, and when the sandwiching piece 60C and the sheet material 250C are not fixed to each other, the housing spaces are continuously located.

Figure 12:
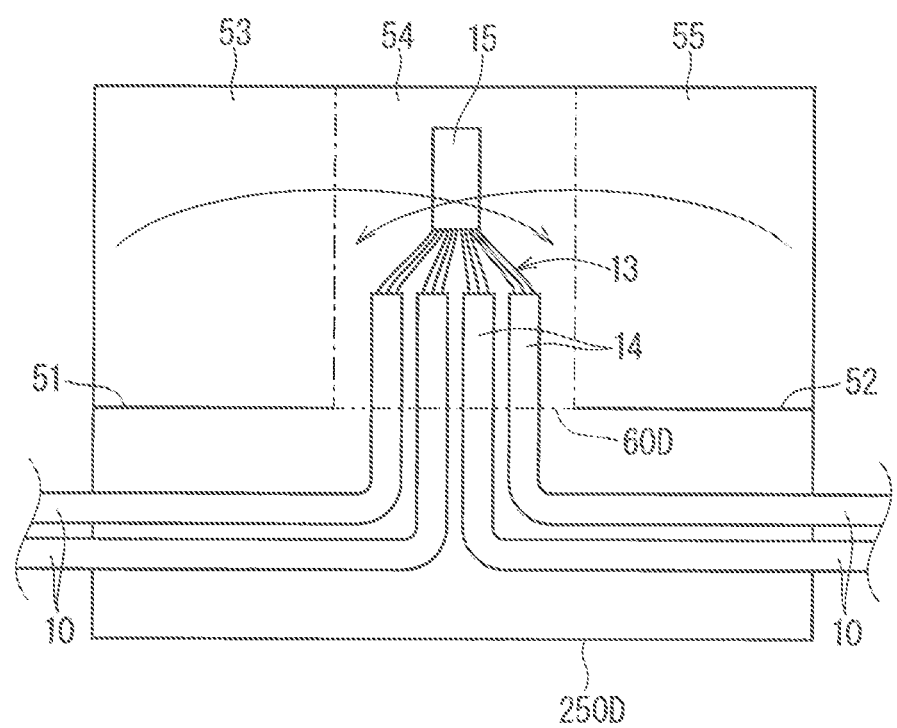
FIG. 12 is an explanation drawing illustrating a third modification example of a way to fold a sheet material.

FIG. 12 is an explanation drawing illustrating a third modification example of a way to fold the sheet material 250.

In the example described above, the sheet material 250 is folded in two to form the sandwiching piece 60, however, this configuration is not necessary. The sheet material 350 may be folded in three or more to form a sandwiching piece 60D, in an example illustrated in FIG. 12, slits 51 and 52 are provided and a sheet material 250D are folded in three to form the sandwiching piece 60D. As a matter of course, it is also applicable that the slits 51 and 52 are not provided but the sheet material 250D is folded in three or more.

In the example illustrated in FIG. 12, the fold line L may be set to extend from an end portion of a first slit 51 extending from one edge portion of the sheet material 250D and an end portion of a second slit 52 extending from the other edge portion of the sheet material 250D. More specifically, when three sides folded in three are defined as a first piece 53, a second piece 54, and a third piece 55, the slits 51 and 52 are located on lateral sides of the first piece 53 and the third piece 55. Then, the first piece 53 and the third piece 55 are folded back along the fold line L and are overlapped with the second piece 54. In the example illustrated in FIG. 12, the first piece 53 and the third piece 55 are folded back to be located on the second piece 54. At this time, the first piece 53 or the third piece 55 may be located on an upper side. As a matter of course, it is also applicable that the first piece 53 or the third piece 55 is folded back to a lower side of the second piece 54 and the second piece 54 is located between the first niece 53 and the third piece 55. That is to say, as an overlapping state of the first piece 53, the second piece 54, and the third piece 55, the first piece 53 may be located in a center, the second piece 54 may located in a center, or the third piece 55 may located in a center.

The fold line L may be set to extend from an intermediate portion and an end portion of one slit 51 extending from one edge portion of the sheet material 250D. More specifically, one slit 51 is located on the lateral sides of the first piece 53 and the second piece 54 in the first piece 53, the second piece 54, and the third piece 55 having a positional relationship described above. Then, the first piece 53 and the second piece 54 are overlapped with the third piece 55. In the overlapping state at this time, any of the first piece 53, the second piece 54, and the third piece 55 may be located in the center as with the configuration described above. There may also be a case where the splice part 15 is sandwiched between the first piece 53 and the second piece 54, both of which are folded. Also in this case, when the second piece 54 and the third piece 55 are continuous, the sandwiching structure is considered to be achieved by the sheet material 50 and the sandwiching piece 60D. When the second piece 54 and the third piece 55 are not continuous, it is considered that the first piece 53 and the second piece 54 constitute the winding piece 30, and are fixed to the third piece 55 which is the sheet material.

Other Modification Example

In the above description, one splice part 15 is fixed to one sheet material 50, however, this configuration is not necessary. The plurality of splice parts 50 may be fixed to one sheet material 50.

In this case, it is applicable that the plurality of splice parts 15 are collectively fixed to one sheet material 50 by one wrapping material 20 or one sandwiching piece 60, or the plurality of splice parts 15 are separately fixed to one sheet material 50. When the plurality of splice parts 15 are separately fixed to one sheet material 50, the fixing state of each splice part to one sheet material 50 may be the same or different from each other.

Specifically, the first splice part 15 formed to be a first electrical wire group and a second splice part 15 formed to be a second electrical wire group may be collectively fixed to one sheet material 50 by one wrapping material 20 or one sandwiching piece 60. The first splice part 15 formed to be the first electrical wire group and the second splice part 15 formed to be the second electrical wire group may be separately fixed to one sheet material 50. At this time, it is also applicable that the first splice part 15 is fixed to one sheet material 50 by the first wrapping material 20 or the first sandwiching piece 60 and the second splice part 15 is fixed to one sheet material 50 by a fixing state which is second wrapping material 20 or a second sandwiching piece 60 and is the same type as the fixing state of the first splice part 15. It is also applicable that be first splice part 15 is fixed one sheet material 50 by the wrapping material 20 and the second spit part 15 is fixed to one sheet material 50 by the sandwiching piece 60.

The configurations described in the embodiments and modification examples thereof can be appropriately combined as long as they are not contradictory. For example, it is also considered Shat the splice part 15 covered by she wrapping material 20 is sandwiched between the sheet material 50 and the sandwiching piece 60.

This disclosure can also be considered a wiring member including the fixing structure 1 of the splice part.

EXPLANATION OF REFERENCE SIGNS

1 fixing structure of splice part
10 electrical wire
12 core wire
13 core wire exposed part
14 covering
15 splice part
16 terminal splice part
17 intermediate splice part
18 parallel part
19 branch part
20 wrapping material
22 tube-like member
24 annular part
26 bottom part
30 winding piece
40 waterproof agent
50 sheet material
60 sandwiching piece
70 intervening member
80 wire-like transmission member
L fold line

The invention claimed is:

1. A fixing structure of a splice part, comprising:
a plurality of electrical wires each having the splice part and mutually connected;
a sheet material to which the splice part is fixed;
a wire-like transmission member provided separately from the plurality of electrical wires and fixed to the sheet material; and
a sandwiching piece fixed to the sheet material in a state where the splice part is sandwiched between the sandwiching piece and the sheet material, wherein
the sandwiching piece is formed by folding a part of the sheet material.

2. The fixing structure of the splice part according to claim 1, wherein
a portion of the plurality of electrical wires away from the splice part is fixed to the sheet material in addition to the splice part.

3. The fixing structure of the splice part according to claim 1, further comprising
a wrapping material fixed to the sheet material in a state of wrapping a whole periphery of the splice part.

4. The fixing structure of the splice part according to claim 3, wherein
the wrapping material includes a tube-like member molded into a tube-like shape and the splice part is housed in the tube-like member.

5. The fixing structure of the splice part according to claim 3, wherein
the wrapping material includes a winding piece formed separately from the sheet material and wound around a periphery of the splice part to wrap the splice part.

6. The fixing structure of the splice part according to claim 3, wherein
the wrapping material is fixed to the sheet material by a contact area indirect fixation.

7. The fixing structure of the splice part according to claim 3, wherein
the wrapping material is fixed to the sheet material by a contact area direct fixation.

8. The fixing structure of the splice part according to claim 7, wherein
another side member fixed to the sheet material by a contact area direct fixation is formed by a material identical with a material of the sheet material.

9. The fixing structure of the splice part according to claim 1, wherein
a parallel part in which the plurality of electrical wires are arranged parallel to each other is sandwiched between the sheet material and the sandwiching piece.

10. The fixing structure of the splice part according to claim 1, wherein
the sandwiching piece and the sheet material are fixed by a contact area direct fixation.

11. The fixing structure of the splice part according to claim 10, wherein
a housing space component part constituting a housing space of the splice part in the sheet material and the sandwiching piece and a portion of the plurality of electrical wires constituting the splice part having contact with the housing space component part are fixed by a contact area direct fixation in a liquid-tight form.

* * * * *